United States Patent Office 2,899,472
Patented Aug. 11, 1959

2,899,472

PREPARATION OF MONOCHLORO-1,1-DIFLUOROETHANES

Frank A. Bower, Woodstown, N.J., and Jack W. Heberling, Jr., Monroe Park, Del., assignors to E. I. du Pont de Nemours and Company, Wilmington, Del., a corporation of Delaware No Drawing. Application April 23, 1957
Serial No. 654,452

4 Claims. (Cl. 260—653.8)

This invention relates to the preparation of monochloro-1,1-difluoroethanes and particularly to the thermal chlorination of 1,1-difluoroethane under conditions which suppress competing side reactions.

The monochloro-1,1-difluoroethanes are well-known and valuable products. The 1-chloro-1,1-difluoroethane, B.P. −9° C., is useful as a refrigerant and as a propellent for aerosol dispensible materials. Both the 1-chloro-1,1-difluoroethane and the 2-chloro-1,1-difluoroethane, B.P. 35.1° C., are intermediates for a variety of fluorinated materials, particularly for the production of the commercially important vinylidene fluoride, $CH_2=CF_2$, by dehydrochlorination of the monochloro-1,1-difluoroethane by known methods.

It has been proposed to produce monochloro-1,1-difluoroethanes by the chlorination of 1,1-difluoroethane under a variety of conditions, none of which have proved to be satisfactory. Henne et al., J.A.C.S., 61, 938 (1939) and Calfee et al., U.S. Patent No. 2,499,129 have disclosed that 1,1-difluoroethane can be monochlorinated in the presence of light at temperatures of from room temperature up to about 120° C. A purely thermal process would be less costly but at these low temperatures is not practical. When it has been attempted to speed up the reaction by the use of materially higher temperatures, with or without light, it has been found that several competing side reactions take place, greatly decreasing the yield of the desired monochloro-1,1-difluoroethanes. The most prominent side reactions are the splitting off of HF from the 1,1-difluoroethane, the splitting off of HCl from the monochloro-1,1-difluoroethane, and the production of large amounts of polychlorinated products (regardless of the proportion of chlorine employed) due to the fact that the monochlorinated products tend to chlorinate more rapidly than the 1,1-difluoroethane under the conditions employed. Calfee et al. Patents No. 2,499,129, No. 2,459,767 and No. 2,469,290, McBee Patent No. 2,644,845, and Johnston Patent No. 2,722,558.

It is an object of this invention to provide a new process for the direct thermal chlorination of 1,1-difluoroethane to produce monochloro-1,1-difluoroethanes in high yields. A particular object is to provide such a process wherein a combination of correlated conditions are employed which suppress side reactions and produce the monochloro-1,1-difluoroethanes as the greatly predominant products. Other objects are to advance the art. Still other objects will appear hereinafter.

The above and other objects may be accomplished according to this invention which comprises passing a gaseous mixture of 0.2 to 0.8 mol of chlorine and 1 mol of 1,1-difluoroethane in the absence of light through an unobstructed reaction zone defined by solid surfaces which consist of a metal of the group consisting of nickel, Monel metal, Inconel and platinum heated to a temperature of from about 375° C. to about 475° C. and maintaining the gaseous mixture in the reaction zone for a period of from about 2 to about 6 seconds coordinated with the mol ratio of the reactants and with the temperature to coincide with substantially complete consumption of the free chlorine.

By operating the process in the aforesaid manner, i.e. under the recited conditions in combination, competing side reactions are largely suppressed and there is obtained a high yield of monochloro-1,1-difluoroethanes, usually in excess of about 85% up to about 95% based on the 1,1-difluoroethane which is not recovered (consumed in the reaction). The recited conditions are all critical and interrelated. To obtain practical rates of reaction, high yields of chloro-1,1-difluoroethanes, minimum yields of polychlorinated products, and minimal HF split off with the formation of unsaturated compounds, e.g. vinylidene fluoride, $CH_2=CF_2$, and vinyl fluoride, $CH_2=CHF$, these variables must be within the designated limits and the reaction zone must be as specified. The splitting off of hydrogen halide from the 1,1-difluoroethane and the monochloro-1,1-difluoroethanes is very greatly suppressed, the HF split off being less than 2.5 mol percent. Likewise, the formation of polychlorinated products is very greatly suppressed. The monochloro-1,1-difluoroethanes and unreacted 1,1-difluoroethane are readily separable from each other and from other organic and inorganic products obtained in the reaction mixture. Recovered, unreacted 1,1-difluoroethane may be returned to the reaction. The process is simple and easy to operate and is economically practical commercially.

It is essential that the reaction zone be defined by solid surfaces which consist of nickel, Monel metal, Inconel or platinum, i.e. that all surfaces of the reactor which come into contact with the reactants and the reaction products at reaction temperatures be composed of one of said metals. The reactor may be of any suitable form but usually will be in the form of a tube made of such metal or lined with such metal. In these reactors, under the conditions of the invention, less than 2.5 mol percent of hydrogen fluoride, based on the moles of 1,1-difluoroethane fed to the reactor, is produced. In other so-called inert reactors, such as glass, graphite, and "Hastelloy C," the quantities of hydrogen fluoride produced are intolerably high, and the process is unsatisfactory for practical commercial operation. Since high conversions of 1,1-difluoroethane to HF are paralleled by low yields of monochloro-1,1-difluoroethanes, the nature of the reactor surfaces is critical.

The quantities of chlorine and 1,1-difluoroethane employed in the present process correspond to mole ratios of 0.2 to 0.8 mole of chlorine to one mole of 1,1-difluoroethane. To ensure reasonably high conversions of starting material to desired product, mole ratios of at least 0.5/1 and up to 0.75/1 are preferred. Mole ratios of less than 0.2/1, while operable, are impractical on a commercial scale. The obtainable yields of monochlorinated 1,1-difluoroethane are particularly sensitive to mole ratios at or above the designated upper limit. Above 0.8/1 these yields begin to decrease markedly, and increased quantities of polychlorinated products and a variety of unsaturates are produced, particularly vinylidene fluoride, $CF_2=CH_2$, by thermal (and chlorine catalyzed) split off of HCl from monochlorodifluoroethane. Maintenance of proper temperatures and contact times largely suppresses formation of such products when operating at mole ratios in the vicinity of 0.8.

Temperatures for the present process may vary from about 375° C. to about 475° C. For best results, they will range from 400° to 450° C. In this preferred range, and at $Cl_2/CH_3CF_2H$ mole rations of 0.2–0.8/1 and at contact times of from about 2 to about 6 seconds, chlorine is substantially completely consumed, and yields of monochloro-1,1-difluoroethanes are at least 85%, usually over 90%. By percent yield is meant 100 times the ratio of the number of moles of product to the number of moles of unrecovered 1,1-difluoroethane. At temperatures materially below about 375° C., the percent conversion of 1,1-difluoroethane to monochlorinated product is quite low, amounting to about 5 mole percent at 340° C. for example, and becomes practical at about 375° C. Temperatures in excess of 450–475° C. in general favor increased formation of HF and of unsaturated products with the result that the yield of chlorodifluoroethane decreases drastically.

The contact time selected, that is, the time during which the mixture of reactants is in contact with the heated reactor will normally depend upon the mole ratio of the reactants and the reaction temperature. The optimum contact time for any set of conditions is easily determined by trial, and generally coincides with the time required for all of the molecular chlorine to react substantially completely, a process readily followed by chemical means. Once all the free chlorine is consumed, further contact of 1,1-difluoroethane and its reaction products with the heated reactor should be avoided. Unnecessary exposure of the organic constituents to the temperature prevailing in the hot reactor leads to increased formation of vinyl fluoride, $CH_2=CHF$, (by HF splitting out of 1,1-difluoroethane), and vinylidene fluoride, $CH_2=CF_2$ (by HCl splitting out of chlorodifluoroethane). In the present process, contact times of from about 2 to about 6 seconds will normally be satisfactory at temperatures up to about 450° C. It will usually be preferred to use the longer contact times with the higher $Cl_2$ to $CH_3CF_2H$ mole ratios. Also it will usually be desired to use the shorter contact times with the higher temperatures and the longer contact times with the lower temperatures. Contact times less than 2 seconds, while operable for producing monochloro-1,1-difluoroethanes, do not always result in substantially complete utilization of the chlorine and thus are not commercially practical. At contact times appreciably higher than about 6 seconds (as well as at higher temperatures), the percent unsaturates and percent polychlorinated products increase undesirably. The preferred contact times are 3–5 seconds in the preferred temperature range and at the preferred mol ratios of $Cl_2$ to $CH_3CF_2H$.

Conventional chemical processing equipment may be employed in the process of this invention. Elaborate physical plants are not required. Concurrently anhydrous gaseous 1,1-difluoroethane and chlorine are mixed and passed through a heated reaction tube. The gaseous products are collected and separated in the usual way, such as the procedure disclosed by Calfee et al. in Patent No. 2,499,629. For example, the organic constituents may be separated from the inorganic (i.e. hydrogen chloride, and unreacted $Cl_2$, and any hydrogen fluoride produced in the reaction) by passing the product stream through aqueous scrubbers, conveniently water followed by aqueous caustic in series, followed by drying and subsequent fractionation of the organic materials. The caustic may be sodium hydroxide, potassium hydroxide, or the like, 20% aqueous potassium hydroxide being used in the examples. Any recovered 1,1-difluoroethane may be recycled through the reactor. The process may be continuous or semi-continuous. In the continuous process, hydrogen halide may be removed anhydrously (e.g. by adsorption) and the organic mixture continuously fractionated, products being withdrawn and unchanged starting material being recycled to the reactor.

The nickel, platinum, Monel metal or Inconel reactor is preferably tubular, long and narrow, to ensure adequate heating of the reactant mixture and good control of the contact time. Contact time is a function of flow rate and the dimensions (length and diameter) of the heated section of the reactor. The reactors are conveniently heated either by passing an electric current through wire coiled around the outer metal skin of the reactor or by an electric furnace jacketing the reactor.

In the following examples wherein nickel, Monel metal and Inconel tubes were employed, each was 4 feet long, had an inside diameter of 0.5 inch, and was heated over lengths of 34 inches, 24 inches and 24 inches, respectively. The platinum reactor was a 4 foot length of 0.5 inch inside diameter nickel pipe fully lined with a platinum insert; the heated reaction zone was 24 inches long. The "Hastelloy C" reactor was a 3 foot length of pipe having an inside diameter of one inch and heated over a section 24 inches long. The graphite reactor consisted of a 19 inch length of 1.5 inch outside diameter graphite rod (analyzing less than 0.05% non-combustible ash) with a 0.25 inch inside diameter bore along its longitudinal axis. The rod was surrounded by a gas-tight nickel jacket, a 14 inch length of which was heated electrically as were all the other reactors. Temperatures were measured at several points on the outer surface of the reactors by thermocouples.

Two analyses were made on each run. The scrubber solution was analyzed for chloride and fluoride ions by standard chemical methods to determine the extent of HF formation and to obtain necessary information on material balance. The dry acid-free product was weighed and analyzed by means of standardized mass spectrometric techniques. The mass spectrometer is convenient to use and provides accurate quantitative analyses of the complex mixture of reaction products. The desired products in the reaction mixture are easily separated from the starting material and from the by-products by fractional distillation through an efficient column. Substantially the same results are obtained by this method of analysis, if coupled with a physical method such as infrared analysis, when close boiling fractions are obtained.

The mixture of organic substances obtained consists of unreacted 1,1-difluoroethane, 1-chloro-1,1-difluoroethane, 2-chloro-1,1-difluoroethane, overchlorinated products, such as the di-, tri- and tetra-chloro-1,1-difluoroethanes, and unsaturates, such as $CH_2=CF_2$, $CH_2=CFH$, $CF_2=CHCl$, $CF_2=CCl_2$.

In the subject process, monochloro-1,1-difluoroethanes are the major products. The ratio of the 1,1,1- to the 2,1,1-isomer varies somewhat with the reaction conditions. In general however, the higher the combined yield of monochloro-1,1-difluoroethanes the smaller is the 1,1,1- to 2,1,1-ratio. For example, when the reactor is nickel and the combined yields are of the order of 85–95%, this ratio is found to be about 6–8/1. Yields of 1-chloro-1,1-difluoroethane are of the order of 80%.

EXAMPLE 1

The reactor was a nickel tube 0.5" I.D. x 48" long, electrically heated to and maintained at 425° C. over a 34" section of its length. $CH_3CF_2H$ and $Cl_2$ were mixed and passed through the reactor at a rate of 0.794 gram of $CH_3CF_2H$ per min. and 0.435 gram of $Cl_2$ per min. The flow rates correspond to a $Cl_2/CH_3CF_2H$ mole ratio of 0.51/1 and a contact time of 2.4 seconds. The product stream was scrubbed and condensed as described above. The scrubber solution (20% aqueous KOH) was analyzed for inorganic products. The composition of the organic product was determined using the mass spectrometer.

Of the material fed to the reactor, all of the chlorine had been consumed. 45.5 mol percent of 1,1-difluoroethane had undergone reaction; 1.1 mol percent was converted to HF.

The composition of the organic product is given below.

| Product | Percent Yield [1] |
|---|---|
| Monochloro-1,1-difluoroethanes | 94.1 |
| Vinyl fluoride | 0.67 |
| Vinylidene fluoride | 2.47 |
| Polychlorinated material | 3.02 |

[1] Percent Yield=100×moles of product recovered/moles of $CH_3CF_2H$ not recovered.

The yield of 1-chloro-1,1-difluoroethane was 81.5%; that of 2-chloro-1,1-difluoroethane was 12.6%. The overchlorinated products consisted of $CF_2ClCH_2Cl$, $CHF_2CHCl_2$, $CHF_2CCl_3$ and $CF_2=CHCl$ in the relative ratio of 5.4:27.4:2.4:1. $CF_2=CHCl$ is referred to as an "overchlorinated" product since it most probably is formed by dehydrochlorination of a dichloro compound.

Substantially the same results are obtained on fractionally distilling the reaction mixture of organic products through an efficient column.

The high yield of monochloro-1,1-difluoroethane and the low yield (2.4%) of HF, based on the quantity of 1,1-difluoroethane that underwent reaction (i.e. unrecovered) is surprising in view of the prior art.

EXAMPLE 2

The procedure of Example 1 was repeated in the region of 5 different temperatures (375, 400, 425, 450 and 475° C.). Mole ratios and contact times were varied in each temperature range studied. Typical results are tabulated below, in which T is the temperature employed, C.T. is the contact time, $VF_2$ is vinylidene fluoride ($CH_2=CF_2$), and poly-Cl is polychlorinated products:

*Thermal chlorination of 1,1-difluoroethane (DFE)*

400° C. REGION

[Chlorodifluoroethanes]

| T., ° C. | Mol Ratio, $Cl_2$/DFE | C.T., sec. | Yield, Percent | Isomer Ratio | $VF_2$, Percent Yield | HF, Mol Percent | Poly-Cl, Percent Yield |
|---|---|---|---|---|---|---|---|
| 404 | 0.45 | 3.5 | 92.1 | 6.5 | 2.7 | 0.7 | 4.4 |
| 397 | 0.58 | 5.9 | 89.5 | 7.9 | 2.7 | 2.1 | 2.5 |
| (399 | 1.1 | 6.3 | 73.2 | 10.6 | 8.4 | 1.9 | 16.8) |

425° C. REGION

| 418 | 0.72 | 4.8 | 93.9 | 6.2 | 2.5 | 0.8 | 1.3 |
|---|---|---|---|---|---|---|---|
| 426 | 0.79 | 5.0 | 87.9 | 7.3 | 4.5 | 2.3 | 5.9 |
| (425 | 0.84 | 8.5 | 76.1 | 11.2 | 13.9 | 1.2 | 9.1) |
| (422 | 0.97 | 4.6 | 76.2 | 9.0 | 14.7 | 0.3 | 9.2) |
| (426 | 1.4 | 4.3 | 40.2 | 38.8 | 21.3 | 0.7 | 21.0) |

450° C. REGION

| 452 | 0.34 | 3.2 | 93.0 | 6.6 | 2.9 | 1.2 | 3.2 |
|---|---|---|---|---|---|---|---|
| 453 | 0.64 | 5.2 | 88.9 | 6.9 | 4.3 | 1.6 | 4.5 |
| (456 | 0.97 | 3.5 | 67.7 | 11.2 | 20.2 | 4.7 | 6.8) |
| (449 | 1.5 | 5.9 | 55.1 | 18.0 | 13.8 | 8.1 | 30.4) |

475° C. REGION

| 475 | 0.79 | 4.7 | 84.8 | 7.0 | 8.1 | 1.1 | 5.1 |
|---|---|---|---|---|---|---|---|

The bracketed test results are for purposes of comparison.

The data show that (a) conversion of 1,1-difluoroethane to HF can be virtually completely suppressed, (b) percent yield of monochloro-1,1-difluoroethanes is dependent primarily upon the mol ratio of the reactants and secondarily on contact time and temperature, (c) high mol ratios and long contact times promote formation of vinylidene fluoride ($VF_2$).

The polychlorinated products consist of one or more of $CF_2ClCCl_3$, $CF_2ClCHCl_2$, $CF_2HCCl_3$, $CF_2ClCH_2Cl$, $CF_2HCHCl_2$, $CF_2=CCl_2$ and $CF_2=CHCl$. The products not shown in the table included a variety of unsaturates, including vinyl fluoride and chlorinated monofluoroolefins.

EXAMPLE 3

When Example 1 was repeated, except that the nickel reactor was replaced by a graphite, "Hastelloy C," or Pyrex glass tube of comparable dimensions, the following results were obtained.

*Effect of reactor on HF split off*

| Reactor | T., ° C. | Mol Ratio, $Cl_2$/DFE | C.T., sec. | Mol Percent HF |
|---|---|---|---|---|
| graphite | 402 | 0.69 | 4.2 | 11.7 |
| Do | 426 | 0.4 | 7.4 | 19.2 |
| Do | 454 | 0.67 | 5.9 | 15.0 |
| "Hastelloy C" | 425 | 0.4 | 7.4 | 25.0 |
| glass | 424 | 0.55 | 6.5 | 6.0 |

The analyses for organic products from the graphite reactor are too unreliable to be cited. The analysis for HF is independent of the analyses for organic products and is valid.

The results obtained in glass are: percent yield monochloro 92.9, polychloro 0.29, $VF_2$ 2.2, vinylfluoride 4.0, others 0.12. Although the desired product is obtained in excellent yield, use of the glass reactor for this purpose is impractical because of HF split off.

The results obtained in the "Hastelloy C" reactor are quite unusual: the combined yield of the monochlorodifluoroethanes was 47%; polychloro 0.92%; unsaturates containing less than 2F atoms 41.2%; $VF_2$ 3.7% and unidentified products 3.2%. The unsaturates containing less than 2F atoms (representing HF loss) are CH=CHF (26.5%), $CH_2=CHCl$ (11.6%) and $CH_2=CFCl$ (3.1%).

Formation of 6 mol percent HF is intolerable in glass. The large quantities of HF produced in graphite and in "Hastelloy C" represent considerable yield losses.

Although contact times were somewhat above the optimum for the mole ratios employed, the results cannot be attributed to the contact times alone. At the temperatures employed, HF formation is primarily a function of the reactor and secondarily of mole ratio and contact time.

"Hastelloy C" is one of series of nickel-base alloys which are generally recognized as having high resistance to corrosives such as hot hydrochloric acid, hot sulfuric acid, wet chlorine, etc. It is generally useful for chemical plant service, including chlorinations. According to engineering handbooks, its approximate composition is 58–60% Ni, 5–8% Fe, 17% Mo, 14% Cr, and minor amounts of W, Mu, Si and C.

EXAMPLE 4

The procedure of Example 1 was repeated in the platinum, Monel metal and Inconel reactors described earlier. The results are tabulated below.

*Effect of reactor on thermal chlorination of 1,1-difluoroethane (DFE)*

[T=406–415° C. C.T=4 sec.]

| Reactor | $Cl_2$/DFE | Percent Yield | Isomer Ratio | $VF_2$, Percent Yield | HF, Mol Percent | Poly-Cl, Percent Yield |
|---|---|---|---|---|---|---|
| Platinum | 0.7 | 86.0 | 8.7 | 10.4 | 1.0 | 2.5 |
| Monel | 0.6 | 89.8 | 12.4 | 7.6 | 0.8 | 0.89 |
| Monel | 0.8 | 86.2 | 12.0 | 10.9 | 0.3 | 2.1 |
| Inconel | 0.7 | 88.1 | 11.1 | 7.7 | 2.1 | 3.3 |

In the table, chloro-DFE means the mixture of 1-chloro-1,1-difluoroethane and 2-chloro-1,1-difluoroethane. The yields of the 1,1,1- isomer in these reactors is as good as those obtained in nickel, but yields of the 2,1,1-isomer are lower. The increase in vinylidene fluoride ($VF_2$) is apparently at the expense of the 2,1,1-isomer.

The superiority of the nickel, platinum, Monel metal and Inconel reactors over the "Hastelloy C" reactor of Example 3, is apparent.

It will be understood that the preceding examples are given for illustrative purposes solely and that this invention is not limited to the specific embodiments described therein. On the other hand, it will be apparent to those skilled in the art that variations can be made in the apparatus, procedures, proportions of reactants and other conditions within the limits set forth in the general description without departing from the spirit or scope of this invention.

It will be apparent that this invention provides a novel process which is simple, easy, and economical to operate commercially whereby there is obtained high yields of monochloro-1,1-difluoroethanes, particularly of the most valuable 1-chloro-1,1-difluoroethane, while greatly suppressing side reactions. Therefore, this invention constitutes a valuable advance in and contribution to the art.

The embodiments of the invention in which an exclusive property or privilege is claimed are defined as follows:

1. The process for making monochloro-1,1-difluoroethanes which comprises passing a gaseous mixture of 0.2–0.8 mol of chlorine and 1 mol of 1,1-difluoroethane in the absence of light through an unobstructed reaction zone defined by solid surfaces which consist of a metal of the group consisting of nickel, Monel metal, Inconel and platinum while maintaining the reaction zone and the reactants at a temperature of from about 375° C. to about 475° C., and maintaining the gaseous mixture in the reaction zone for a period of from about 2 to about 6 seconds coordinated with the mol ratio of the reactants and with the temperature to coincide with substantially complete consumption of the free chlorine.

2. The process for making monochloro-1,1-difluoroethanes which comprises passing a gaseous mixture of 0.2–0.8 mol of chlorine and 1 mol of 1,1-difluoroethane in the absence of light through an unobstructed reaction zone defined by solid surfaces which consist of nickel while maintaining the reaction zone and the reactants at a temperature of from about 375° C. to about 475° C., and maintaining the gaseous mixture in the reaction zone for a period of from about 2 to about 6 seconds coordinated with the mol ratio of the reactants and with the temperature to coincide with substantially complete consumption of the free chlorine.

3. The process for making monochloro-1,1-difluoroethanes which comprises passing a gaseous mixture of about 0.5 to about 0.75 mol of chlorine and 1 mol of 1,1-difluoroethane in the absence of light through an unobstructed reaction zone defined by solid surfaces which consist of a metal of the group consisting of nickel, Monel metal, Inconel and platinum while maintaining the reaction zone and the reactants at a temperature of from about 400° C. to about 450° C., and maintaining the gaseous mixture in the reaction zone for a period of from about 3 to about 5 seconds coordinated with the mol ratio of the reactants and with the temperature to coincide with substantially complete consumption of the free chlorine.

4. The process for making monochloro-1,1-difluoroethanes which comprises passing a gaseous mixture of about 0.5 to about 0.75 mol of chlorine and 1 mol of 1,1-difluoroethane in the absence of light through an unobstructed reaction zone defined by solid surfaces which consist of nickel while maintaining the reaction zone and the reactants at a temperature of from about 400° C. to about 450° C. and maintaining the gaseous mixture in the reaction zone for a period of from about 3 to about 5 seconds coordinated with the mol ratio of the reactants and with the temperature to coincide with substantially complete consumption of the free chlorine.

References Cited in the file of this patent

UNITED STATES PATENTS

| | | |
|---|---|---|
| 2,130,084 | Groll et al. | Sept. 13, 1938 |
| 2,499,629 | Calfee et al. | Mar. 7, 1950 |
| 2,644,845 | McBee | July 7, 1953 |